A. P. Messer.
Inhaling Tube.
No. 89,591.        Patented May 4, 1869.
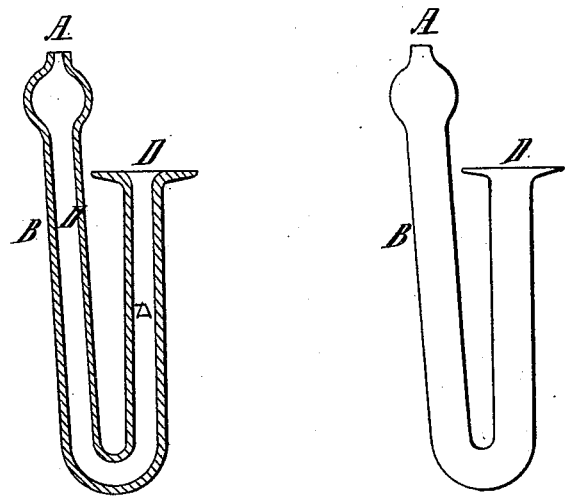
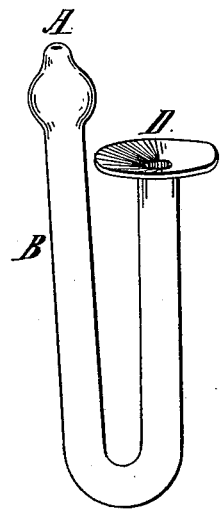
Witnesses
J. W. H. Roger
S. A. Wills
Inventor
Allen. P. Messer

UNITED STATES PATENT OFFICE.

ALLEN P. MESSER, OF BOSTON, MASSACHUSETTS, ASSIGNOR TO JOHN W. H. ROGERS, OF SAME PLACE.

IMPROVED INHALING-TUBE.

Specification forming part of Letters Patent No. 89,591, dated May 4, 1869.

*To whom it may concern:*

Be it known that I, ALLEN P. MESSER, of Boston, in the county of Suffolk and State of Massachusetts, have invented a new and Improved Mode of Inhaling Liquids through the Nostrils, for medicinal purposes and otherwise; and I do hereby declare that the following is a full and exact description thereof, reference being had to the accompanying drawing, and to the letters of reference thereon.

The nature of my invention consists of a hollow tube, of glass or other substance, in the form of a siphon.

By pouring into the end D a sufficient quantity to fill the vacuum D B, and inserting the end $a$ into the nostril, the contents may be snuffed through the nostril to the throat.

What I claim as my invention, and desire to secure by Letters Patent, is—

The siphon inhaling-tube constructed substantially as herein described, and for the purpose set forth.

ALLEN P. MESSER.

Witnesses:
A. A. WOODBURY,
G. W. HALLETT.